United States Patent
Ohseki et al.

(10) Patent No.: US 12,408,113 B2
(45) Date of Patent: Sep. 2, 2025

(54) COMMUNICATION DEVICE, CONTROL METHOD AND COMPUTER-READABLE STORAGE MEDIUM FOR EXECUTING TRANSMISSION POWER CONTROL IN RELAY TRANSMISSION

(71) Applicant: KDDI CORPORATION, Tokyo (JP)

(72) Inventors: Takeo Ohseki, Fujimino (JP); Issei Kanno, Fujimino (JP); Naoto Tsumachi, Fujimino (JP); Kosuke Yamazaki, Fujimino (JP)

(73) Assignee: KDDI CORPORATION, Tokyo (JP)

( * ) Notice: Subject to any disclaimer, the term of this patent is extended or adjusted under 35 U.S.C. 154(b) by 416 days.

(21) Appl. No.: 17/953,709

(22) Filed: Sep. 27, 2022

(65) Prior Publication Data
US 2023/0013001 A1    Jan. 19, 2023

Related U.S. Application Data

(63) Continuation of application No. PCT/JP2021/007870, filed on Mar. 2, 2021.

(30) Foreign Application Priority Data

Mar. 30, 2020  (JP) ................ 2020-061035

(51) Int. Cl.
*H04W 52/14* (2009.01)
*H04W 52/24* (2009.01)

(52) U.S. Cl.
CPC ....... *H04W 52/143* (2013.01); *H04W 52/245* (2013.01)

(58) Field of Classification Search
CPC ................ H04W 52/143; H04W 52/245

USPC .......................................... 370/318
See application file for complete search history.

(56) References Cited

U.S. PATENT DOCUMENTS

| | | | |
|---|---|---|---|
| 2013/0281148 A1* | 10/2013 | Seyama | H04W 52/30 455/522 |
| 2018/0035389 A1 | 2/2018 | Hessler et al. | |
| 2020/0053655 A1 | 2/2020 | Ghosh et al. | |

FOREIGN PATENT DOCUMENTS

| | | |
|---|---|---|
| JP | 2010-109914 A | 5/2010 |
| WO | WO-2020/032580 A1 | 2/2020 |

OTHER PUBLICATIONS

3GPP TSG RAB Meeting #86, "Enhancements to Integrated Access and Backhaul for NR", RP-193251, Sitges, Dec. 9-12, 2019.

(Continued)

*Primary Examiner* — Gbemileke J Onamuti
(74) *Attorney, Agent, or Firm* — Foley & Lardner LLP

(57) ABSTRACT

A communication device capable of connecting to and communicating with another device using a first function operating as a terminal device and a second function operating as a base station device, the communication device acquires a first reception power density of a signal of a downlink received from an upstream device connected by the first function, acquires a second reception power density of a signal of an uplink received from a downstream device connected by the second function, and transmits a transmission power control command for controlling transmission power of the signal of the downlink to the upstream device, based on the first reception power density and the second reception power density.

12 Claims, 4 Drawing Sheets

(56) References Cited

OTHER PUBLICATIONS

3rd Generation Partnership Project; Technical Specification Group Radio Access Network; NR; Study on Integrated Access and Backhaul (Release 16); 3GPP TR 38.874 V16.0.0 (Dec. 2018).
International Search Report and Written Opinion issued in corresponding International Application No. PCT/JP2021/007870 mailed May 11, 2021, with partial English translation.
Extended European Search Report issued in corresponding European Patent Application No. 21781266.8, dated Aug. 23, 2023 (8 pages).

* cited by examiner

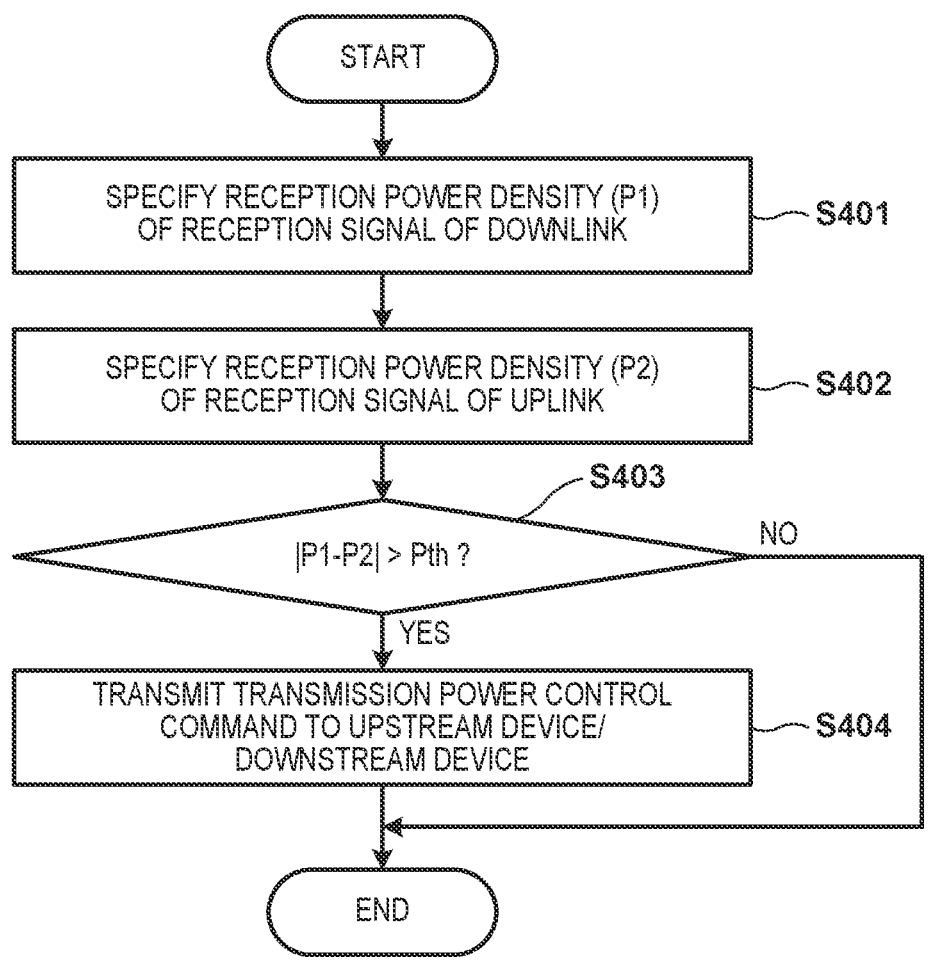

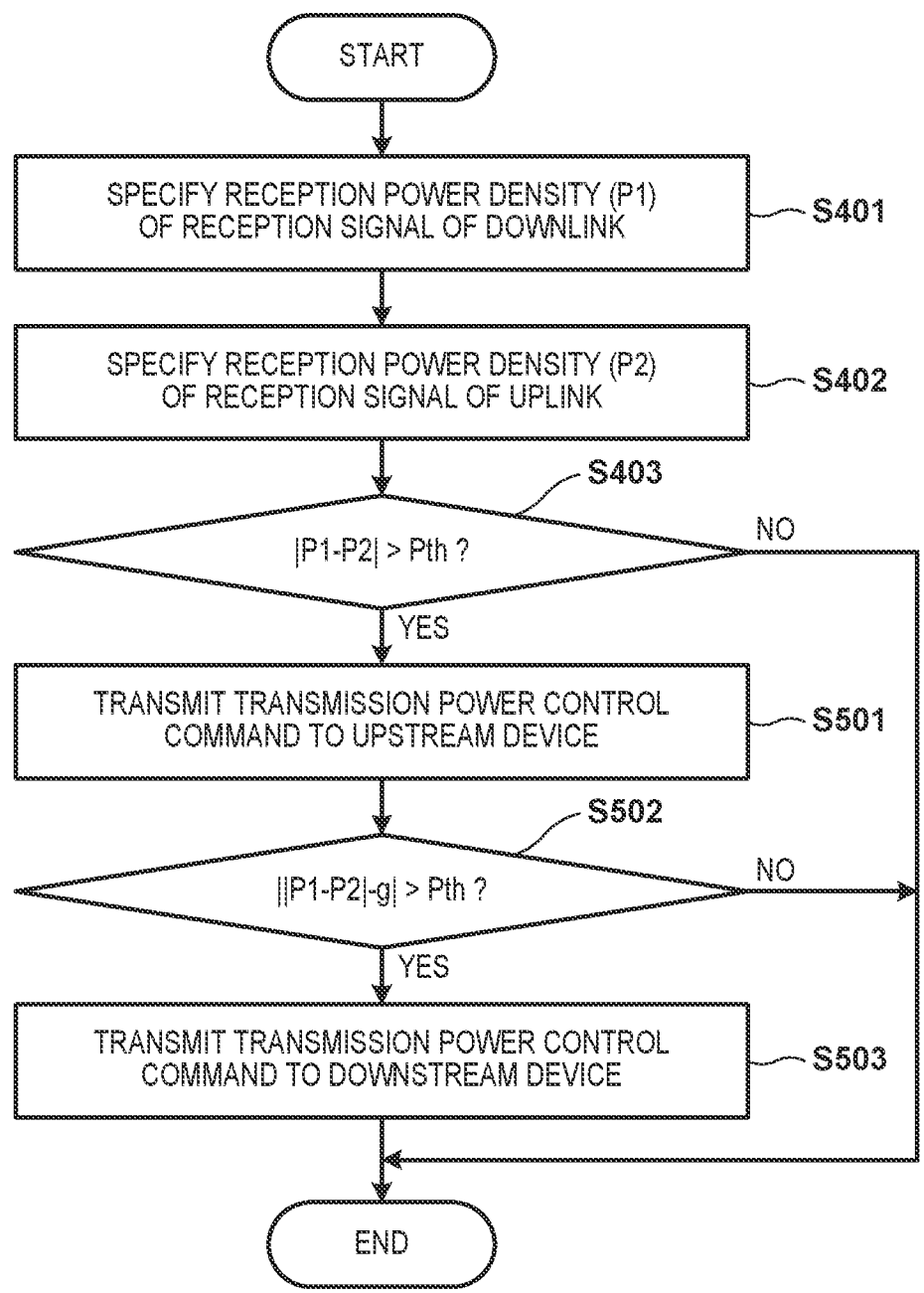

COMMUNICATION DEVICE, CONTROL METHOD AND COMPUTER-READABLE STORAGE MEDIUM FOR EXECUTING TRANSMISSION POWER CONTROL IN RELAY TRANSMISSION

CROSS-REFERENCE TO RELATED APPLICATION(S)

This application is a continuation of International Patent Application No. PCT/JP2021/007870 filed on Mar. 2, 2021, which claims priority to and the benefit of Japanese Patent Application No. 2020-061035 filed on Mar. 30, 2020, the entire disclosures of which are incorporated herein by reference.

BACKGROUND OF THE INVENTION

Field of the Invention

The present invention relates to a communication device, a control method and a computer-readable storage medium, and more particularly relates to a technology for improving communication quality in a relay transmission system.

Description of the Related Art

The 3rd Generation Partnership Project (3GPP) is investigating a technology that enables a technique for terminal devices to access a network to be used in application to backhaul links in a fifth generation (5G) wireless communication network (see 3GPP, TR38.874, V16.0.0, December 2018). This technology is called Integrated Access and Backhaul (IAB). A relay device called an IAB node establishes a connection with a 5G base station device (IAB donor), for example, using a wireless link. At this time, the IAB node may directly connect to the IAB donor by establishing a wireless link with the IAB donor, or may indirectly establish a connection with the IAB donor by establishing a wireless link with another IAB donor that has directly or indirectly established a connection with the IAB donor. At this time, the IAB node establishes a wireless connection with another device (upstream device) on the IAB donor side, by functioning as a terminal device for connecting to a base station device. Also, after the connection with the IAB donor is established, the IAB node is able to establish a connection with another IAB node that is looking to connect to that IAB donor. In this case, the IAB node operates similarly to a base station device and establishes a wireless connection with the other IAB node (downstream device) which operates as a terminal device. In this way, an IAB node has a terminal function (MT, Mobile Termination) and a function (DU, Distributed Unit) of operating similarly to a base station device, and is able to relay communication between the upstream device and the downstream device using these functions.

In 3GPP Release 16, relay transmission by an IAB node is performed by time sharing. For example, the IAB node receives a signal from the upstream device in a certain time slot and transfers the signal to the downstream device in the next time slot. Similarly, the IAB node receives a signal from the downstream device in a certain time slot and transfers the signal to the upstream device in the next time slot, for example. In contrast, in 3GPP Release 17, signals are assumed to be multiplexed by frequency division multiplexing, spatial division multiplexing or the like (see 3GPP, RP-193251, December 2019).

In such a multiplexing environment, the IAB node can receive signals simultaneously with both the MT and the DU. Also, the IAB node can receive signals in which MT-addressed signals and DU-addressed signals are mixed, in the case where the MT antenna and the DU antenna cannot be sufficiently spaced apart or where the MT and DU share an antenna, for example. Also, it can be assumed that, in the IAB node, the MT and DU share an RF (Radio Frequency) circuit or a baseband circuit, and that even if separate circuits are provided for the MT and DU, these circuits will affect each other. At this time, if there is not a large power difference between the MT-addressed signal and the DU-addressed signal, these signals can be appropriately separated, by using a bandpass filter in the case where frequency division multiplexing is used, for example, and by an appropriate antenna weight being set in the case where spatial division multiplexing is used, for example. On the other hand, if there is a large power difference between these signals, communication quality can deteriorate even if separation by filter or antenna weight is undertaken.

SUMMARY OF THE INVENTION

The present invention provides a technology for improving communication quality in a relay transmission system in which a signal of a downlink and a signal of an uplink can be received simultaneously.

A communication device according to one aspect of the present invention is a communication device capable of connecting to and communicating with another device using a first function operating as a terminal device and a second function operating as a base station device, the communication device having an acquisition unit configured to acquire a first reception power density of a signal of a downlink received from an upstream device connected by the first function, and acquire a second reception power density of a signal of an uplink received from a downstream device connected by the second function, and a transmission unit configured to transmit a transmission power control command for controlling transmission power of the signal of the downlink to the upstream device, based on the first reception power density and the second reception power density.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain principles of the invention.

FIG. 4 is a diagram showing an example of the flow of processing that is executed by an IAB node.

FIG. 5 is a diagram showing an example of the flow of processing that is executed by an IAB node.

DESCRIPTION OF THE EMBODIMENTS

Figure 1:
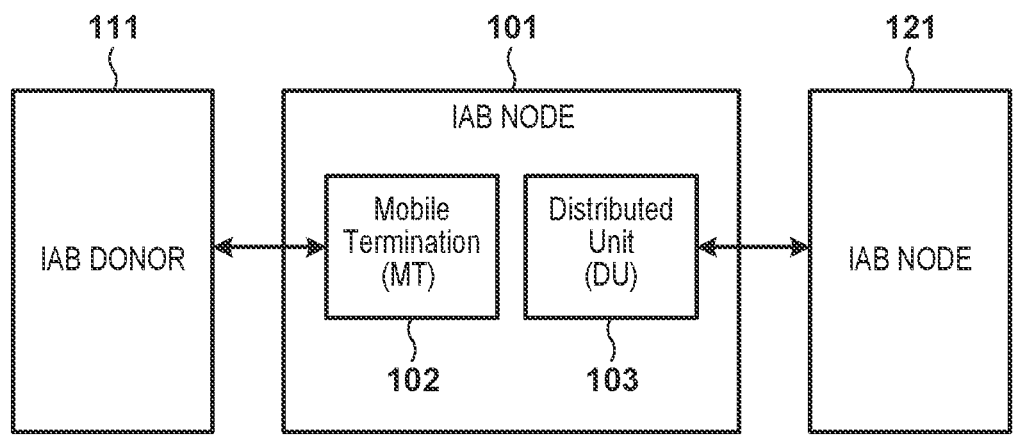
FIG. 1 is a diagram showing an example configuration of a wireless communication system.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate.

Furthermore, in the attached drawings, the same reference numerals are given to the same or similar configurations, and redundant description thereof is omitted.

System Configuration

FIG. 1 shows an example configuration of a wireless communication system of the present embodiment. The wireless communication system according to the present embodiment is a relay transmission system based on Integrated Access and Backhaul (IAB) defined by 3GPP, and is configured to include an IAB node 101 that executes relay transmission.

The IAB node 101 is a communication device capable of connecting to and communicating with a base station device (IAB donor 111) using an MT (Mobile Termination) 102 that functions as a terminal device. Note that, here, an example of the case of connecting to the IAB donor 111 using the function of the MT 102 is shown, but the present invention is not limited thereto, and, for example, the function of the MT 102 may be used to connect to another IAB node (not shown) directly or indirectly connected to the IAB donor. In this way, the IAB node 101 is able to connect to the IAB donor 111 operating as a base station device directly or indirectly using the function of the MT 102. Also, after connecting to the IAB donor 111, the IAB node 101 functions as part of the base station device, that is, as a DU (Distributed Unit) 103 of the base station device. The IAB node 101 then establishes a connection with a terminal device (not shown) using the function of the DU 103, and relays communication between that terminal device and the IAB donor 111.

The IAB node 101 is, furthermore, also capable of using the function of the DU 103 to connect to and communicate with another IAB node 121 operating as a terminal device. In this case, the other IAB node 121 will establish a connection with the IAB node 101, using the function of an MT. In this way, the IAB node 101 connects to a device (upstream device) on the base station device side on the relay path such as the IAB donor 111, and, in parallel, connects to a device (downstream device) on the opposite side to the base station device side on the relay path such as the other IAB node 121. Note that the IAB node 101 may connect to a plurality of other IAB nodes, using the function of the DU 103, for example.

The IAB node 101 is able to transmit a signal of a downlink to the other IAB node 121, while transmitting a signal of an uplink to the IAB donor 111, for example. Similarly, the IAB node 101 is able to receive a signal of an uplink from the other IAB node 121, while receiving a signal of a downlink from the IAB donor 111, for example. Note that the IAB node 101 may be configured to be capable of simultaneously executing signal transmission and signal reception. The IAB node 101 generally includes an antenna, an RF (Radio Frequency) circuit, a baseband circuit and the like for transmitting and receiving signals. Furthermore, the IAB node 101 is constituted to include a dedicated hardware circuit and program for realizing the respective functions of the MT 102 and the DU 103.

The IAB node 101 is able to share the antenna, RF circuit, baseband circuit and the like for the MT and DU. In this case, a first reception signal received from an upstream device and a second reception signal received from a downstream device will be treated as a combined signal in at least these parts that are shared. Here, in the case where the antenna and the RF circuit are shared, the signal having the higher power will be dominant when there is a large power difference between the first reception signal and the second reception signal, and when the dynamic range of the amplifier is not sufficiently large, for example, the signal having the lower power will not be sufficiently amplified, which can lead to difficulties with demodulation and decoding depending on the case. On the other hand, assuming that a large number of IAB nodes 101 are disposed, providing an amplifier and the like having a sufficiently large dynamic range for all the IAB nodes 101 is not realistic. Also, in the case where the first reception signal and the second reception signal are frequency division multiplexed, for example, only one of the signals is able to pass through the bandpass filter, although it is assumed that components of the other signal will leak into the frequency band of the signal that passes through the bandpass filter. At this time, the influence of out-of-band components of the signal having the higher power on the signal having the lower power is assumed to be greater when there is a large power difference between the two signals, for example. It is common for frequency deviation to occur between of the local oscillators of different devices such as the IAB donor 111 and the other IAB node 121, and it is assumed that sufficient orthogonality of these signals cannot be ensured. As a result, the reception performance of the signal having the lower power can greatly deteriorate. Similarly, even if spatial separation is achieved, the signal having the higher power can strongly affect the signal having the lower power due to channel estimation error.

In view of this, in the present embodiment, the IAB node 101 executes control such that the power difference between the first reception signal received from the IAB donor 111 and the second reception signal received from the other IAB node 121 is less than or equal to a predetermined value.

For example, the IAB node 101 is capable of transmitting a transmission power control command to the IAB donor 111, via the function of the MT 102. In the case where, for example, a value obtained by subtracting the power of the second reception signal received from the other IAB node 121 from the power of the first reception signal received from the IAB donor 111 exceeds a predetermined value, the IAB node 101 transmits a signal instructing the IAB donor 111 to decrease the transmission power of the signal. Also, in the case where, for example, a value obtained by subtracting the power of the first reception signal received from the IAB donor 111 from the power of the second reception signal received from the other IAB node 121 exceeds a predetermined value, the IAB node 101 transmits a signal instructing the IAB donor 111 to increase the transmission power of the signal. In a situation where there is a large power difference between the first reception signal and the second reception signal, that power difference can thereby be reduced and the reception quality of the signals can be improved. Note that the IAB node 101 can, for example, transmit the transmission power control command in a PUCCH (Physical Uplink Control Channel), together with an acknowledgment (ACK) of a signal transmitted from the IAB donor 111. Also, the IAB node 101 may, for example, transmit the transmission power control command in a PUSCH (Physical Uplink Shared Channel) that is in response to a PDCCH (Physical Downlink Control Channel) transmitted from the IAB donor 111.

Also, the IAB node 101 is capable of transmitting a transmission power control command to the other IAB node 121, via the function of the DU 103, in addition to or instead of transmitting a transmission power control command to the IAB donor 111. In the case where, for example, a value obtained by subtracting the power of the second reception signal received from the other IAB node 121 from the power of the first reception signal received from the IAB donor 111 exceeds a predetermined value, the IAB node 101 transmits a signal instructing the other IAB node 121 to increase the transmission power of the signal. Also, in the case where, for example, a value obtained by subtracting the power of the first reception signal received from the IAB donor 111 from the power of the second reception signal received from the other IAB node 121 exceeds a predetermined value, the IAB node 101 transmits a signal instructing the other IAB node 121 to decrease the transmission power of the signal. In a situation where there is large power difference between the first reception signal and the second reception signal, that power difference can thereby be reduced and the reception quality of the signals can be improved. Note that the IAB node 101 can, for example, transmit the transmission power control command in a PDCCH (Physical Downlink Control Channel) or a PDSCH (Physical Downlink Shared Channel) that is transmitted to the other IAB node 121.

Note that transmission power control commands that are transmitted by the uplink and the downlink may include information indicating the amount of increase/decrease in transmission power, for example. The IAB node 101 may freely determine the amount of increase/decrease, or may select one of a plurality of levels indicating amounts of increase/decrease. When one of the plurality of levels is selected, information indicating the selection result is included in the transmission power control command. In the case where the amount of increase/decrease in power is designated in the transmission power control command received from the IAB node 101, the IAB donor 111 or the other IAB node 121 increases/decreases the transmission power by the designated amount. Note that, in the case where the amount of increase/decrease in power is not designated in the transmission power control commands, the IAB donor 111 or the other IAB node 121 can increase/decrease the transmission power by a certain amount in response to receiving a transmission power control command. Similarly, when a transmission power control command is received from the IAB donor 111 or the other IAB node 121, the IAB node 101 can change the transmission power of the uplink or the transmission power of the downlink according to the received command.

Note that, even in the case where, for example, the difference between the power of the first reception signal received from the IAB donor 111 and the power of the second reception signal received from the other IAB node 121 is less than or equal to the predetermined value, the IAB node 101 can transmit a transmission power control command to the IAB donor 111 so as to decrease the transmission power, if the reception power of the first reception signal exceeds a first predetermined value. Similarly, even in the case where, for example, the difference between the power of the first reception signal and the power of the second reception signal is less than or equal to the predetermined value, the IAB node 101 can transmit a transmission power control command to the IAB donor 111, so as to increase the transmission power, if the reception power of the first reception signal is less than a second predetermined value. Also, even in the case where, for example, the difference between the power of the first reception signal and the power of the second reception signal is less than or equal to the predetermined value, the IAB node 101 can transmit a transmission power control command to the other IAB node 121, so as to decrease the transmission power, if the reception power of the second reception signal exceeds a third predetermined value. Also, even in the case where, for example, the difference between the power of the first reception signal and the power of the second reception signal is less than or equal to the predetermined value, the IAB node 101 can transmit a transmission power control command to the other IAB node 121, so as to increase the transmission power, if the reception power of the second reception signal is less than a fourth predetermined value.

The IAB node 101 is able to transmit transmission power control commands to both the IAB donor 111 and the other IAB node 121. At this time, the IAB node 101 is able to adjust the transmission power with respect to the other IAB node 121 which is the downstream device by adjusting the amount of wireless resources that are allocated, but is unable to perform such adjustment on the IAB donor 111 which is the upstream device. The IAB node 101 thus preferentially adjusts the transmission power of the IAB donor 111, and then controls the transmission power of the other IAB node 121. Thus, for example, the IAB node 101 can execute transmission power control on the IAB donor 111, and, under the premise that the power of the reception signal received from the IAB donor 111 will be changed due to that transmission power control, determine whether transmission power control on the other IAB node 121 is necessary. Transmission power control of the downlink with respect to which the degree of freedom of transmission power control is relatively low can thereby be preferentially performed, making it possible to perform appropriate adjustment of transmission power on the uplink and the downlink. Note that a configuration may be adopted in which the IAB node 101 adjusts the transmission power of the other IAB node 121 first, and then controls the transmission power of the IAB donor 111.

By adopting the above configuration, in the present embodiment, the IAB node transmits a transmission power control command to the upstream device and/or the downstream device, such that the difference in reception power between the downlink signal received from the upstream device and of the uplink signal received from the downstream device will be less than or equal to a predetermined value. The reception quality of the respective signals can thereby be improved, by the difference in reception power between the downlink signal and uplink signal that are received by the IAB node being less than or equal to the predetermined value.

Device Configuration

Figure 2:
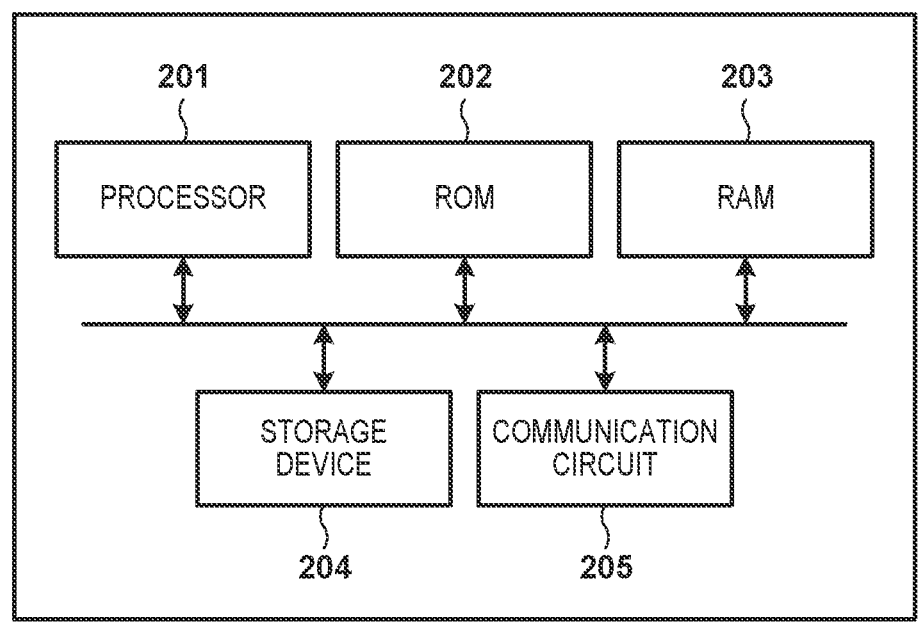
FIG. 2 is a diagram showing an example hardware configuration of an IAB node.

Next, the configuration of the IAB node 101 that executes processing such as the above will be described. FIG. 2 shows an example hardware configuration of the IAB node 101. The IAB node 101, in one example, has a processor 201, a ROM 202, a RAM 203, a storage device 204 and a communication circuit 205. In the IAB node 101, a computer-readable program for realizing respective functions of the IAB node 101 such as described above and recorded in one of the ROM 202, the RAM 203 and the storage device 204, for example, is executed by the processor 201. Note that the processor 201 may be replaced by one or more processors such as an ASIC (Application Specific Integrated Circuit), a FPGA (Field-Programmable Gate Array) and a DSP (Digital Signal Processor).

The IAB node 101 controls the communication circuit 205 with the processor 201, for example, to communicate with a partner device (e.g., IAB node 111, other IAB node 121, etc.). Note that FIG. 2 shows a schematic diagram in which the IAB node 101 has one communication circuit 205, but the present invention is not limited thereto. For example, the IAB node 101 may have a communication device for communication with the IAB donor 111 and a communication device for communication with the other IAB node 121. Note that, even in the case of having separate communication devices for communication with the IAB donor 111 and the other IAB node 121, the downlink signal received from the IAB donor 111 and the uplink signal received from the other IAB node 121 can affect each other, due to factors such as the antenna being disposed close by, for example.

Figure 3:
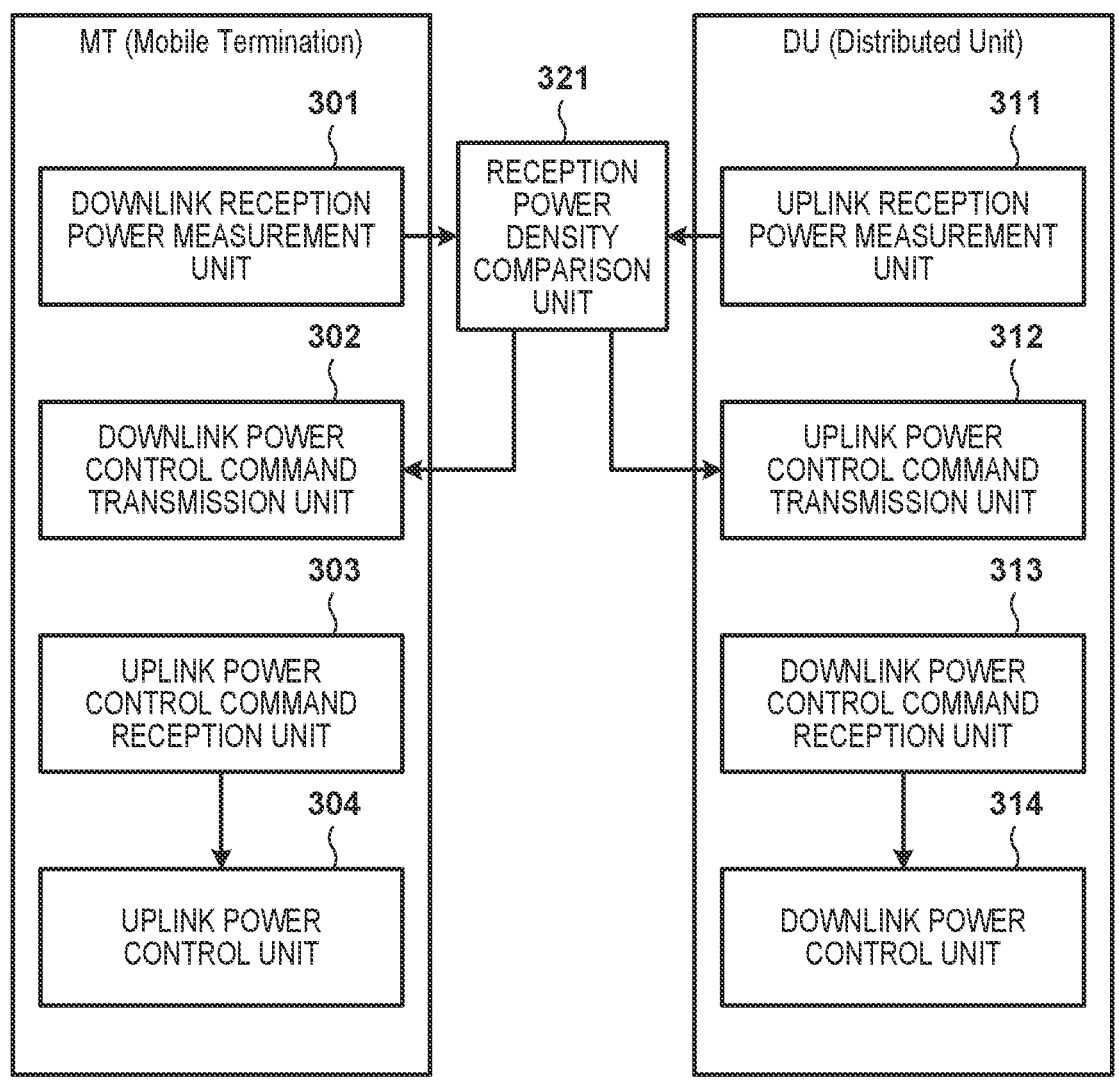
FIG. 3 is a diagram showing an example functional configuration of an IAB node.

FIG. 3 shows an example functional configuration of the IAB node 101. This functional configuration can be partially or wholly realized by the processor 201 executing a program stored in the ROM 202 or the storage device 204, for example. Also, dedicated hardware for realizing this function configuration may be provided. Also, the functional configuration of FIG. 3 may be realized by a processor that is included in the communication circuit 205 executing a dedicated program, for example. Note that FIG. 3 depicts only a group of functions related to the present embodiment, among the functions of the IAB node 101, and the IAB node 101 naturally has functions for operating as an IAB node other than these functions. Also, some of the functions in FIG. 3 may be omitted, or the functions in FIG. 3 may be replaced by other functions having a similar capacity.

The IAB node 101 includes the MT that functions as a terminal device and the DU that functions as a base station device as described above. The MT has a downlink reception power measurement unit 301 and a downlink power control command transmission unit 302, for example, and the DU has an uplink reception power measurement unit 311 and an uplink power control command transmission unit 312, for example. Also, the IAB node 101 includes a reception power density comparison unit 321.

The downlink reception power measurement unit 301 measures the power density (P1) at the time that a signal transmitted from the upstream device (IAB donor 111) is received. The uplink reception power measurement unit 311 measures the power density (P2) at the time that a signal transmitted from the downstream device (other IAB node 121) is received. The reception power density comparison unit 321 calculates the difference between the results of measuring the power densities of the reception signals obtained by the downlink reception power measurement unit 301 and the uplink reception power measurement unit 311, and determines whether the magnitude of the difference exceeds a predetermined value. That is, the reception power density comparison unit 321 determines whether the absolute value |P1−P2| of the difference between the reception powers exceeds a threshold power Pth. The reception power density comparison unit 321 then outputs the comparison result to the downlink power control command transmission unit 302 and the uplink power control command transmission unit 312. The downlink power control command transmission unit 302 and the uplink power control command transmission unit 312 then transmit a transmission power control command if necessary, based on the comparison result. The downlink power control command transmission unit 302 transmits a transmission power control command to the upstream device. The uplink power control command transmission unit 312 transmits a transmission power control command to the downstream device. Note that the IAB node 101 need not have one of the downlink power control command transmission unit 302 and the uplink power control command transmission unit 312. Also, the reception power density comparison unit 321 may determine which of the downlink power control command transmission unit 302 and the uplink power control command transmission unit 312 is to transmit the transmission power control command, based on the comparison result.

For example, if P1−P2>Pth, the downlink power control command transmission unit 302 can be configured to transmit a transmission power control command to the upstream device, so as to decrease the transmission power and decrease P1. Also, if P1−P2>Pth, the uplink power control command transmission unit 312 may be configured to transmit a transmission power control command to the downstream device, so as to increase the transmission power and increase P2. At this time, the reception power density comparison unit 321 can determine to perform transmission power control of the downlink, in the case where P1 is larger than a first reference value, and determine to perform transmission power control of the uplink, in the case where P2 is smaller than a second reference value, for example. That is, a configuration can be adopted in which the transmission power of a signal whose reception power is sufficiently small is not decreased, and the transmission power of a signal whose reception power is sufficiently large is not increased.

Similarly, if P2−P1>Pth, the downlink power control command transmission unit 302 can be configured to transmit a transmission power control command to the upstream device, so as to increase the transmission power and increase P1. Also, if P2−P1>Pth, the uplink power control command transmission unit 312 may be configured to transmit a transmission power control command to the downstream device, so as to decrease the transmission power and decrease P2. At this time, the reception power density comparison unit 321 can determine to perform transmission power control of the downlink if P1 is smaller than a third reference value, and determine to perform transmission power control of the uplink if P2 is larger than a fourth reference value, for example.

Also, the reception power density comparison unit 321 may be configured to preferentially perform transmission power control of the downlink, and, at that time, may determine whether to execute transmission power control of the uplink. Note that a configuration may be adopted in which the amount of increase/decrease in power is designated in the transmission power control command, or in which it is only instructed to increase/decrease power without designating the amount.

The IAB node 101 can, furthermore, set the transmission power of a signal to be transmitted thereby, in accordance with a transmission power control command from the upstream device or the downstream device. Thus, the IAB node 101 has an uplink power control command reception unit 303, an uplink power control unit 304, a downlink power control command reception unit 313 and a downlink power control unit 314, for example. When the uplink power control command reception unit 303 receives a transmission power control command from the upstream device, the contents thereof are notified to the uplink power control unit 304, and the uplink power control unit 304 controls the transmission power of the uplink signal that is transmitted to the upstream device. Also, when the downlink power control command reception unit 313 receives a transmission power control command from the downstream device, the contents thereof are notified to the downlink power control unit 314, and the downlink power control unit 314 controls the transmission power of the downlink signal that is transmitted to the downstream device. These power controls are processing for changing the transmission power in accordance with commands, and when an instruction to increase/ decrease power is received, for example, control for increasing/decreasing the transmission power by a certain amount is executed. Also, if an instruction indicating the amount of increase in power or an instruction indicating the amount of decrease in power is received, control for increasing/decreasing the transmission power by the instructed amount can be executed.

Processing Flow

An example of the flow of processing that is executed by the IAB node 101 will now be described using FIG. 4. Note that, here, the processing flow when the IAB node 101 transmits a transmission power control command to another device will be described. That is, the IAB node 101 operates so as to change the transmission power thereof when subjected to transmission power control by another device, but description of that operation will be omitted. Note that the processing described below is merely an example, and some of the processing steps may be omitted or the order in which the processing steps are executed may be changed.

In this processing, first, the IAB node 101 specifies the reception power density (P1) of the reception signal of the downlink and the reception power density (P2) of the reception signal of the uplink through measurement (step S401, step S402). Note that specification of these reception power densities is performed by measuring reference signals of the respective signals, for example, and the execution order of the processing may be reversed. Thereafter, the IAB node 101 determines whether the difference |P1−P2| of the measured reception power densities exceeds a predetermined value (Pth) (step S403). If it is determined that this difference does not exceed the predetermined value (NO in step S403), the IAB node 101 then directly ends the processing of FIG. 4. On the other hand, if it is determined that this difference exceeds the predetermined value (YES in step S403), the IAB node 101 transmits a transmission power control command to the upstream device, or the downstream device, or the both (step S404), such that the difference decreases to within the predetermined value. Which of the upstream device and the downstream device to transmit the transmission power control command to at this time and the contents of the transmission power control command are as described above, and thus description thereof will not be repeated here.

In this way, if the reception power difference exceeds a predetermined value, a transmission power control command is transmitted such that the power difference is reduced. It thereby becomes possible to improve reception quality when the signal of the uplink and the signal of the downlink are received simultaneously.

FIG. 5 illustrates a second example of processing that is executed by the IAB node 101. This processing is an example of processing in the case where transmission power control is executable on both the uplink and the downlink. Note that this processing is similar to FIG. 4 until the determination of whether the difference |P1−P2| of the measured reception power densities exceeds the predetermined value (Pth), and thus description thereof will be omitted here.

If it is determined that the difference |P1−P2| of the measured reception power densities exceeds the predetermined value (Pth), the IAB node 101 first transmits a transmission power control command to the upstream device (step S501). For example, if P1−P2>Pth, the IAB node 101 transmits a transmission power control command instructing to decrease the transmission power of the downlink to the upstream device. Also, if P2−P1>Pth, the IAB node 101 transmits a transmission power control command instructing to increase the transmission power of the downlink to the upstream device.

The IAB node 101 then determines whether a power difference ||P1−P2|−g| after transmission power control exceeds the predetermined value, where g is the change in power density in the case where transmission power control is performed in the upstream device (step S502). If the power difference after transmission power control in the upstream device still exceeds the predetermined value (YES in step S502), the IAB node 101 then transmits a transmission power control command to the downstream device (step S503). On the other hand, if the power difference after transmission power control in the upstream device does not exceed the predetermined value (NO in step S502), the IAB node 101 ends the processing without transmitting a transmission power control command to the downstream device. In this way, a configuration can be adopted in which the upstream device preferentially performs transmission power control. Note that, in FIG. 5, by interchanging the upstream device and the downstream device, it is also possible to adopt a configuration in which the downstream device preferentially performs transmission power control.

In this way, in the case where transmission power control of the uplink and transmission power control of the downlink are executable in parallel, it becomes possible to improve reception quality when the signal of the uplink and the signal of the downlink are received simultaneously, by reducing the reception power difference.

Note that, in the above, an example of the case where a common value is used as the predetermined value serving as the determination criterion for when increasing transmission power and when decreasing transmission power is described, but the present invention is not limited thereto. For example, a configuration may be adopted in which, in step S403 described above, control for decreasing P1/increasing P2 is executed if P1−P2>Pth1, and control for increasing P1/decreasing P2 is executed if P2−P1>Pth2 (Pth1≠Pth2). In this way, it becomes possible to execute more flexible control.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A communication device capable of connecting to and communicating with another device using a first function operating as a terminal device and a second function operating as a base station device, the communication device comprising:
one or more processors; and
one or more memories that store a computer-readable instruction for causing, when executed by the one or more processors, the one or more processors to:
acquire a first reception power density of a signal of a downlink received from an upstream device connected by the first function, and acquire a second reception power density of a signal of an uplink received from a downstream device connected by the second function;
transmit a transmission power control command for controlling transmission power of the signal of the downlink to the upstream device, based on the first reception power density and the second reception power density; and transmit a transmission power control command for controlling transmission power of the signal of the uplink to the downstream device, based on the first reception power density and the second reception power density, wherein, if a value obtained by subtracting the second reception power density from the first reception power density exceeds a first value, at least one of transmission of a transmission power control command instructing to decrease the transmission power of the signal of the downlink to the upstream device or transmission of a transmission power control command instructing to increase the transmission power of the signal of the uplink to the downstream device is executed.

2. The communication device according to claim 1,
wherein a transmission power control command with an instruction of an amount by which to increase power or an amount by which to reduce power included therein is transmitted.

3. The communication device according to claim 2,
wherein the instruction of the amount by which to increase power or the amount by which to reduce power indicates one amount selected from a plurality of levels of amounts of power increase or amounts of power decrease.

4. The communication device according to claim 1,
wherein a transmission power control command for causing the upstream device to control the transmission power of the signal of the downlink is included in a physical uplink control channel.

5. A communication device capable of connecting to and communicating with another device using a first function operating as a terminal device and a second function operating as a base station device, the communication device comprising:
one or more processors; and
one or more memories that store a computer-readable instruction for causing, when executed by the one or more processors, the one or more processors to:
acquire a first reception power density of a signal of a downlink received from an upstream device connected by the first function, and acquire a second reception power density of a signal of an uplink received from a downstream device connected by the second function;
transmit a transmission power control command for controlling transmission power of the signal of the downlink to the upstream device, based on the first reception power density and the second reception power density; and
transmit a transmission power control command for controlling transmission power of the signal of the uplink to the downstream device, based on the first reception power density and the second reception power density,
wherein, if a value obtained by subtracting the first reception power density from the second reception power density exceeds a second value, at least one of transmission of a transmission power control command instructing to increase the transmission power of the signal of the downlink to the upstream device or transmission of a transmission power control command instructing to decrease the transmission power of the signal of the uplink to the downstream device is executed.

6. The communication device according to claim 5,
wherein a transmission power control command with an instruction of an amount by which to increase power or an amount by which to reduce power included therein is transmitted.

7. The communication device according to claim 5,
wherein a transmission power control command for causing the upstream device to control the transmission power of the signal of the downlink is included in a physical uplink control channel.

8. A communication device capable of connecting to and communicating with another device using a first function operating as a terminal device and a second function operating as a base station device, the communication device comprising:
one or more processors; and
one or more memories that store a computer-readable instruction for causing, when executed by the one or more processors, the one or more processors to:
acquire a first reception power density of a signal of a downlink received from an upstream device connected by the first function, and acquire a second reception power density of a signal of an uplink received from a downstream device connected by the second function;
determine whether a first difference between the first reception power density and the second reception power density exceeds a predetermined value;
wherein, if the first difference exceeds the predetermined value, a transmission power control command for controlling transmission power of the signal of the downlink to the upstream device is transmitted, then
whether or not a second difference between the first reception power density and the second reception power density in a case where the transmission power of the signal of the downlink has been controlled in the upstream device exceeds the predetermined value is determined, and
then, if the second difference exceeds the predetermined value, a transmission power control command for controlling transmission power of the signal of the uplink to the downstream device is transmitted.

9. A control method to be executed by a communication device capable of connecting to and communicating with another device using a first function operating as a terminal device and a second function operating as a base station device, the control method comprising:
acquiring a first reception power density of a signal of a downlink received from an upstream device connected by the first function, and acquiring a second reception power density of a signal of an uplink received from a downstream device connected by the second function;
transmitting a transmission power control command for controlling transmission power of the signal of the downlink to the upstream device, based on the first reception power density and the second reception power density; and
transmitting a transmission power control command for controlling transmission power of the signal of the uplink to the downstream device, based on the first reception power density and the second reception power density,
wherein if a value obtained by subtracting the second reception power density from the first reception power density exceeds a first value, at least one of transmission of a transmission power control command instructing to decrease the transmission power of the signal of the downlink to the upstream device or transmission of a transmission power control command instructing to increase the transmission power of the signal of the uplink to the downstream device is executed.

10. A non-transitory computer-readable storage medium that stores a program for causing a computer provided in a communication device capable of connecting to and communicating with another device using a first function operating as a terminal device and a second function operating as a base station device to:

acquire a first reception power density of a signal of a downlink received from an upstream device connected by the first function, and acquire a second reception power density of a signal of an uplink received from a downstream device connected by the second function;

transmit a transmission power control command for controlling transmission power of the signal of the downlink to the upstream device, based on the first reception power density and the second reception power density; and transmit a transmission power control command for controlling transmission power of the signal of the uplink to the downstream device, based on the first reception power density and the second reception power density, wherein if a value obtained by subtracting the second reception power density from the first reception power density exceeds a first value, at least one of transmission of a transmission power control command instructing to decrease the transmission power of the signal of the downlink to the upstream device or transmission of a transmission power control command instructing to increase the transmission power of the signal of the uplink to the downstream device is executed.

11. A control method to be executed by a communication device capable of connecting to and communicating with another device using a first function operating as a terminal device and a second function operating as a base station device, the control method comprising:

acquiring a first reception power density of a signal of a downlink received from an upstream device connected by the first function, and acquiring a second reception power density of a signal of an uplink received from a downstream device connected by the second function;

transmitting a transmission power control command for controlling transmission power of the signal of the downlink to the upstream device, based on the first reception power density and the second reception power density; and transmitting a transmission power control command for controlling transmission power of the signal of the uplink to the downstream device, based on the first reception power density and the second reception power density, wherein, if a value obtained by subtracting the first reception power density from the second reception power density exceeds a second value, at least one of transmission of a transmission power control command instructing to increase the transmission power of the signal of the downlink to the upstream device or transmission of a transmission power control command instructing to decrease the transmission power of the signal of the uplink to the downstream device is executed.

12. A non-transitory computer-readable storage medium that stores a program for causing a computer provided in a communication device capable of connecting to and communicating with another device using a first function operating as a terminal device and a second function operating as a base station device to:

acquire a first reception power density of a signal of a downlink received from an upstream device connected by the first function, and acquire a second reception power density of a signal of an uplink received from a downstream device connected by the second function;

transmit a transmission power control command for controlling transmission power of the signal of the downlink to the upstream device, based on the first reception power density and the second reception power density; and transmit a transmission power control command for controlling transmission power of the signal of the uplink to the downstream device, based on the first reception power density and the second reception power density, wherein, if a value obtained by subtracting the first reception power density from the second reception power density exceeds a second value, at least one of transmission of a transmission power control command instructing to increase the transmission power of the signal of the downlink to the upstream device or transmission of a transmission power control command instructing to decrease the transmission power of the signal of the uplink to the downstream device is executed.

* * * * *